United States Patent
Leger et al.

(10) Patent No.: US 11,691,711 B2
(45) Date of Patent: Jul. 4, 2023

(54) LIGHTWEIGHT STRUCTURE REMOVABLE ENERGY-ABSORBING BARRIER AND AIRCRAFT INCLUDING AT LEAST ONE SUCH REMOVABLE BARRIER

(71) Applicant: AIRBUS SAS, Blagnac (FR)

(72) Inventors: Thierry Leger, Blagnac (FR); Benoît Salgues, Blagnac (FR)

(73) Assignee: AIRBUS SAS, Blagnac (FR)

( * ) Notice: Subject to any disclaimer, the term of this patent is extended or adjusted under 35 U.S.C. 154(b) by 64 days.

(21) Appl. No.: 17/365,288

(22) Filed: Jul. 1, 2021

(65) Prior Publication Data

US 2021/0380216 A1    Dec. 9, 2021

(51) Int. Cl.
*B64C 1/14* (2006.01)
*B64D 45/00* (2006.01)

(52) U.S. Cl.
CPC .......... *B64C 1/1461* (2013.01); *B64C 1/1469* (2013.01); *B64D 45/0028* (2019.08)

(58) Field of Classification Search
CPC . B64C 1/1461; B64C 1/1469; B64D 45/0028; B64D 45/0015
See application file for complete search history.

(56) References Cited

U.S. PATENT DOCUMENTS

| | | | | |
|---|---|---|---|---|
| 3,634,962 A | * | 1/1972 | Peterson ................... | E06B 7/24 49/470 |
| 4,073,452 A | * | 2/1978 | Gosau ................... | B64C 1/1415 244/129.4 |
| 5,533,773 A | | 7/1996 | Lessick | |
| 5,915,652 A | * | 6/1999 | Caldwell .................. | B64D 9/00 248/289.11 |
| 2006/0169840 A1 | | 8/2006 | French et al. | |
| 2007/0246298 A1 | * | 10/2007 | Botti ........................ | A62B 1/16 182/3 |
| 2008/0105389 A1 | * | 5/2008 | Goodman ............... | E05D 15/26 160/206 |
| 2013/0082141 A1 | * | 4/2013 | Koch ........................ | B64C 1/18 244/118.5 |
| 2016/0332718 A1 | | 11/2016 | Guering | |
| 2018/0099762 A1 | * | 4/2018 | Maclean ............ | B64D 45/0021 |
| 2018/0346091 A1 | | 12/2018 | Movsesian et al. | |

FOREIGN PATENT DOCUMENTS

FR       3036098 A1    11/2016
WO    2006024726 A1    3/2006

OTHER PUBLICATIONS

French Search Report; priority document.

* cited by examiner

*Primary Examiner* — Philip J Bonzell
*Assistant Examiner* — Cindi M Curry
(74) *Attorney, Agent, or Firm* — Greer, Burns & Crain, Ltd.

(57) ABSTRACT

A removable barrier and an aircraft including such a removable barrier. The barrier including a panel configured to block at least partly an opening delimited by a frame, a plurality of straps each connected to the panel and each having first and second ends, for each strap, a first connection configured to connect the first end of the strap and a first edge of the frame at least temporarily, a second connection configured to connect the second end of the strap and a second edge of the frame at least temporarily, at least one folded overlength at the level of at least one of the first and second ends of the strap, at least one breakable connection keeping the overlength folded.

17 Claims, 5 Drawing Sheets

LIGHTWEIGHT STRUCTURE REMOVABLE ENERGY-ABSORBING BARRIER AND AIRCRAFT INCLUDING AT LEAST ONE SUCH REMOVABLE BARRIER

CROSS-REFERENCES TO RELATED APPLICATIONS

This application claims the benefit of the French patent application No. 2007120 filed on Jul. 6, 2020, the entire disclosures of which are incorporated herein by way of reference.

FIELD OF THE INVENTION

The present application relates to a removable lightweight energy absorbing barrier and an aircraft including at least one such removable barrier.

BACKGROUND OF THE INVENTION

In accordance with one embodiment, the cockpit of an aircraft is separated from the passenger cabin by a partition including an opening blocked by an armored door that includes a first side connected to the partition by an articulation system and a second side connected to the partition by a locking/unlocking system. The locking/unlocking system is controlled from inside the cockpit. The armored door, its articulation system and its locking/unlocking system, as well as the partition surrounding the door, are sized to absorb forces in the event of an attempt at intrusion. Moreover, the partition and/or the armored door are equipped with a device for equalizing the pressures on either side of the partition and the armored door in the event of depressurization in the cockpit or in the passenger cabin. Finally, a display device enables the persons present in the cockpit:

to see the person wishing to enter and to trigger the unlocking of the armored door if that person is authorized to enter the cockpit, or to be sure that the zone is totally unoccupied before trigging the unlocking of the door for access to the passenger cabin.

When the armored door is closed and locked it offers effective protection against attempted intrusion into the cockpit.

In accordance with one configuration a corridor allows access to the armored door.

For enhanced safety it is possible to use this corridor as an entry airlock and to provide at the entrance of the corridor a removable barrier configured to occupy an open state when the armored door is closed and locked and a closed state when the armored door is unlocked. Thus, if a person wishes to access the cockpit, they take up a position in the corridor and close the removable barrier. The person present in the cockpit can then see the person wishing to enter and trigger the unlocking of the armored door if that person is authorized to enter the cockpit. While the armored door is in the unlocked state the removable barrier prevents anybody entering the corridor and accessing the cockpit. Similarly, for a person to exit the cockpit to go to the passenger cabin, the person situated in the cockpit makes sure that the airlock zone is totally unoccupied.

In accordance with one embodiment, the removable barrier could be a second armored door. This solution is not satisfactory, however, because among other things it leads to a significant increase in the onboard weight corresponding to the weight of the barrier and to the weight of the structural reinforcements necessary for the transmission of forces in the event of an attempt at intrusion. Moreover, it is not necessary for the removable barrier to provide as high a level of resistance as the armored door. It has only to slow down a possible intrusion to give the persons in the cockpit time to close and to lock the armored door.

The present invention is aimed at remedying some or all of the drawbacks of the prior art.

SUMMARY OF THE INVENTION

To this end, the invention has for an object a removable barrier including a panel configured to block, at least partly, an opening delimited by a frame. In accordance with the invention, the removable barrier includes a plurality of straps, each connected to the panel by at least one connection element and each having first and second ends as well as, for each strap, a first connection configured to connect at least temporarily the first end of the strap to a first edge of the frame, a second connection configured to connect at least temporarily the second end of the strap to a second edge of the frame, at least one folded overlength positioned between the connection element and at least one of the first and second ends of the strap, as well as at least one breakable connection keeping the overlength folded.

The invention enables a removable barrier that is of simple design and light in weight to be obtained. Due to the overlengths and to the breakable connections, the removable barrier is capable of equalizing the pressures on either side of the removable barrier, to absorb some of the energy generated at the time of an attempt at intrusion, and to limit the forces transmitted by the barrier to the edges of the frame via the first and second connections. The structures to which the removable barrier is connected therefore do not need to be reinforced or to integrate pressure equalizing systems.

In accordance with another feature, the at least one overlength of each strap is situated at the level of the first or of the second end of the strap so that:

when the overlength corresponds to a first overlength at the level of the first end of the strap, the strap includes the folded first overlength and at least one first breakable connection keeping the first overlength folded and having a first strength threshold; and when the overlength corresponds to a second overlength at the level of the second end of the strap, the strap includes the folded second overlength and at least one second breakable connection keeping the second overlength folded and having a second strength threshold.

In accordance with one particular embodiment of the removable barrier, each strap includes the first overlength and the second overlength.

In accordance with another feature, each overlength includes at least two folds delimiting at least three sections superposed one on the other. Additionally, the breakable connection of each overlength includes at least one seam connecting at least two sections of the overlength and having a length as well as a density of stitches, the length and/or the density of stitches of each seam being adjusted as a function of the strength threshold required for the first breakable connection.

In accordance with another feature, the first strength threshold of the first breakable connection is less than the second strength threshold of the second breakable connection, the first threshold being determined in such a manner that the first breakable connection breaks in the event of a pressure difference on either side of the removable barrier exceeding a given threshold.

In accordance with another feature, for each strap, the strength threshold of each breakable connection is determined to prevent damaging the strap and the first and second connections in the event of loading of the removable barrier.

In accordance with another feature, the panel is flexible.

In accordance with another feature, the panel includes at least one reinforcement to stiffen it.

The invention also has for an object, an aircraft including at least one removable barrier having any of the above features.

In accordance with one configuration, the aircraft includes a cockpit, a passenger cabin, an entry airlock connecting the passenger cabin and the cockpit delimited by an armored door, as well as a removable barrier offset toward the passenger cabin relative to the armored door, the removable barrier being positioned at the level of a frame delimiting an opening and including parallel first and second edges.

In accordance with the invention, the panel has a first face oriented toward the passenger cabin and a second face opposite the first face, the straps being positioned on at least one of the first and second faces.

In accordance with another feature, the first connection of each strap is permanent and connects the first end of each strap and the first edge of the frame.

In accordance with another feature, the removable barrier includes at least one attachment system cooperating with the frame and configured temporarily to connect the second ends of the straps and the frame.

In accordance with another feature, each attachment system includes an eyelet positioned on the strap in the vicinity of the second end and a hook rigidly attached to the frame, the attachment system being configured to occupy an unattached state in which the strap is spaced from the hook and an attached state in which the eyelet of the strap is suspended from the hook.

In accordance with another feature, in each attachment system the hook is positioned on a face of the second edge of the frame oriented toward the cockpit.

In accordance with another feature, the panel includes at least two parts connected by a breakable connection.

In accordance with another feature, the panel includes at least one side connected directly or indirectly to the frame, the breakable connection being positioned close to and parallel to the side of the panel connected directly or indirectly to the frame. In particular, this breakable connection has a strength limit less than that of the breakable connections of the straps.

BRIEF DESCRIPTION OF THE DRAWINGS

Other features and advantages will emerge from the following description of the invention given by way of example only with reference to the appended drawings, in which.

DETAILED DESCRIPTION OF THE PREFERRED EMBODIMENTS

Figure 1:
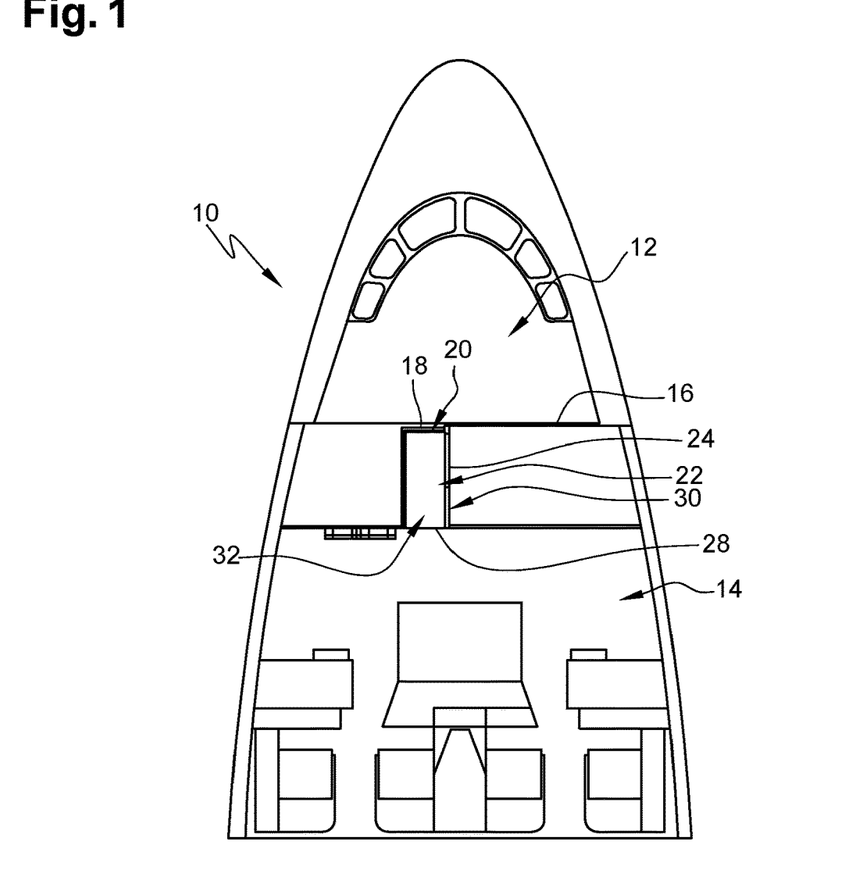
FIG. 1 is a view from above of a front part of an aircraft illustrating one embodiment.

In FIG. 1 an aircraft 10 includes a cockpit 12, a passenger cabin 14, at least one first partition 16 separating the cockpit 12 and the passenger cabin 14, at least one first opening 18 through the first partition 16 and an armored door 20 designed to block the first opening 18. In accordance with one configuration, the aircraft 10 includes a corridor 22 connecting the cockpit 12 and the passenger cabin 14 delimited by first and second lateral walls 24, 26 and leading via the first opening 18 into the cockpit 12 and via a second opening 28, termed the entrance, into the passenger cabin 14. All these elements are known and are not described in more detail.

Figure 2:
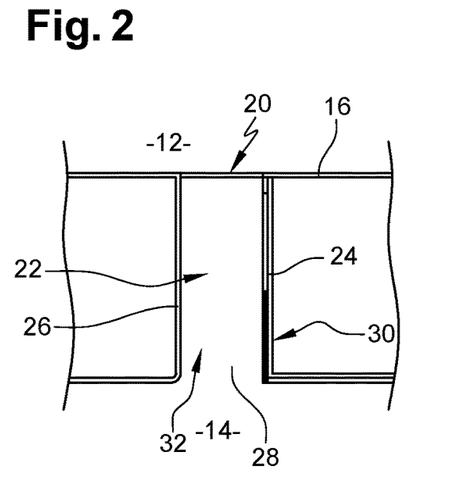
FIG. 2 is a view from above of a cockpit access corridor equipped with a removable barrier in the open state, illustrating one embodiment of the invention.
Figure 3:
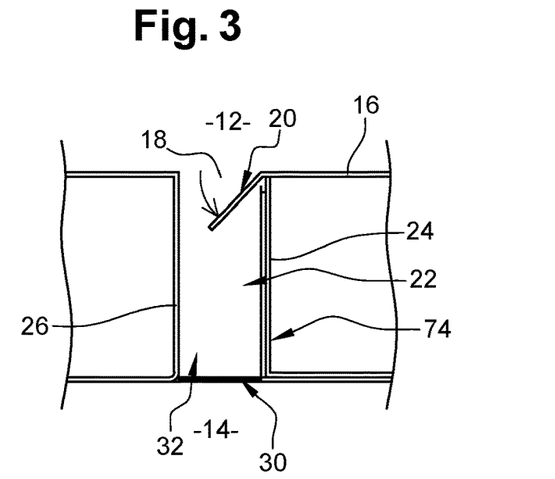
FIG. 3 is a view from above of a cockpit access corridor equipped with a removable barrier in the closed state, illustrating one embodiment of the invention.

In accordance with an embodiment that can be seen in FIGS. 2 and 3, the aircraft 10 includes at least one removable barrier 30 positioned in the corridor 22, offset toward the passenger cabin 14 relative to the armored door 20, and configured to occupy an open state, visible in FIG. 2, in which the removable barrier 30 at least partly frees the corridor 22, and a closed state, visible in FIG. 3, in which the removable barrier 30 blocks the corridor 22 and prevents access to the armored door 20.

In accordance with one configuration in the closed state, the removable barrier 30 is positioned at the level of the entrance or the second opening 28 of the corridor 22.

In accordance with this embodiment the corridor 22, the armored door 20 and the removable barrier 30 form an entry airlock 32 of the cockpit 12. When the armored door 20 is in the closed and locked state, the removable barrier 30 is in the open state. If a person requires to access the cockpit 12, they take up a position in the corridor 22 between the armored door 20 and the removable barrier 30 and close the removable barrier 30. The latter being in the closed state, the armored door 20 is unlocked and opened in complete safety. The removable barrier 30 prevents any intrusion into the cockpit 12. As long as the armored door 20 is in the unlocked state, the removable barrier 30 is in the closed state. As soon as the armored door 20 is again in the locked state, the removable barrier 30 may be positioned in the open state.

Figure 4:
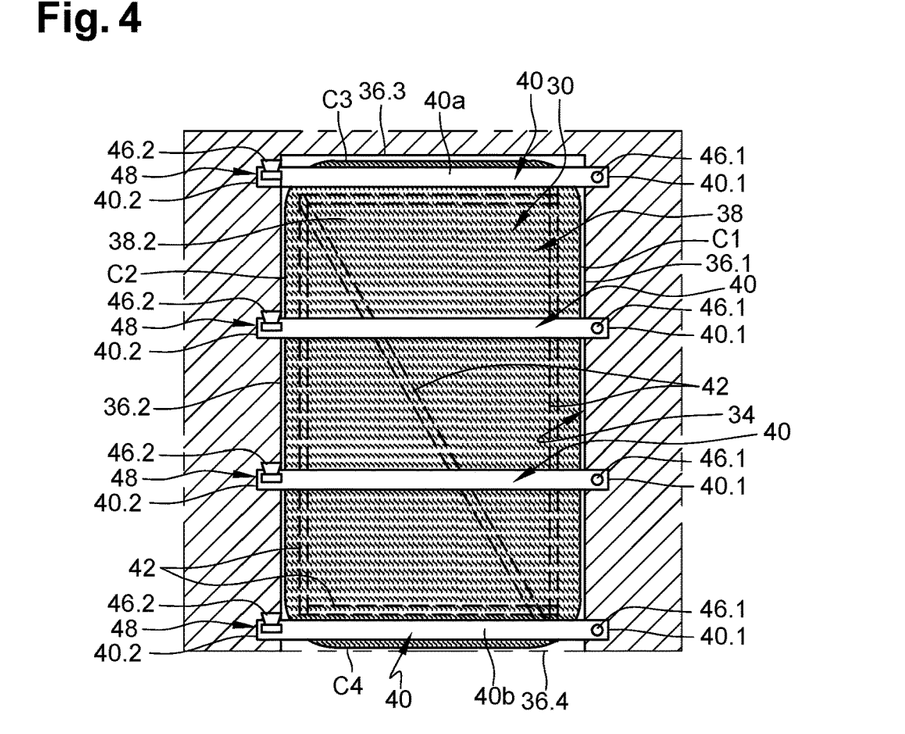
FIG. 4 is a rear view of a removable barrier illustrating one embodiment of the invention.
Figure 5:
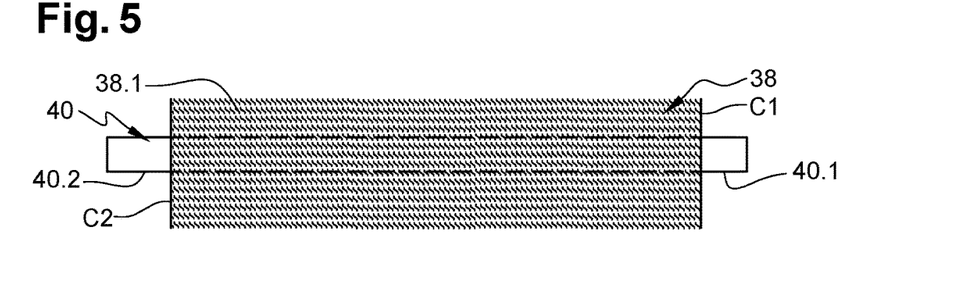
FIG. 5 is a front view of a part of the removable barrier that can be seen in FIG. 4.
Figure 6:
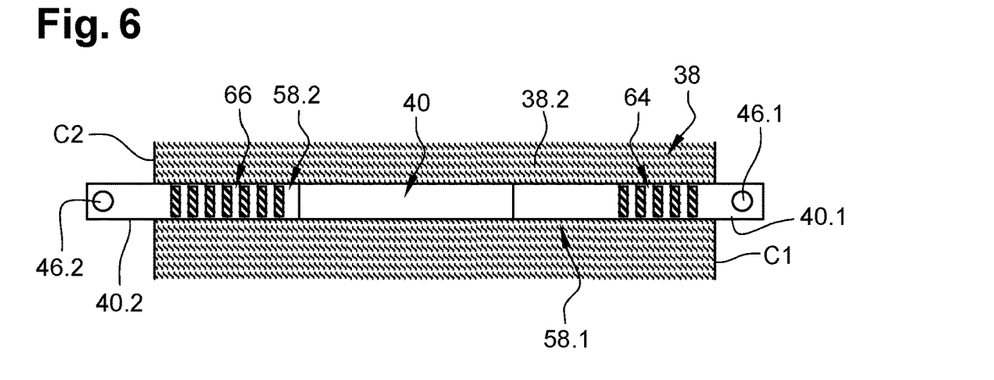
FIG. 6 is a rear view of a part of the removable barrier that can be seen in FIG. 4.

Regardless of the embodiment, in the closed state the removable barrier 30 is positioned at the level of a frame 34 of an opening 28 including two substantially vertical edges 36.1, 36.2 and two substantially horizontal edges 36.3, 36.4, visible in FIG. 4. In the closed state the removable barrier 30 blocks substantially all of the opening 28 and connects the first and second parallel edges. In the remainder of the description, the first and second edges connected by the removable barrier 30 are the two substantially vertical edges 36.1, 36.2. The removable barrier 30 could however connect the two substantially horizontal edges 36.3, 36.4.

Regardless of the embodiment, the frame 34 includes at least two parallel edges.

The removable barrier 30 includes a panel 38 configured to block approximately all of the opening 28 and a plurality of straps 40 connected to the panel 38 and each having a first end 40.1 configured to be connected to the first edge 36.1 at least in the closed state and a second end 40.2 configured to be connected to the second edge 36.2 at least in the closed state.

The panel 38 has a geometry close to that of the opening 28. Thus, the panel 38 has a first side C1 parallel to and close to the first edge 36.1 of the frame 34, a second side C2 parallel to and close to the second edge 36.2 of the frame 34, a third side C3 parallel to and close to the third edge 36.3 of the frame 34, and a fourth side C4 parallel to and close to the fourth edge 36.4 of the frame 34.

In accordance with one embodiment the panel 38 is flexible.

In accordance with a design that can be seen in FIG. 4, the flexible panel 38 includes at least one reinforcement 42 to stiffen it. Each reinforcement 42 may take the form of a rigid or semi-rigid rod or a plurality of rigid or semi-rigid rods placed end to end. Each reinforcement may be made of metal or a composite material, for example.

In accordance with one configuration, the reinforcements 42 are positioned in the vicinity of the sides C1 to C4 of the panel 38. In the case of an approximately rectangular panel 38, the latter includes four reinforcements 42 in the vicinity of the four sides C1 to C4, forming a rectangle, and a fifth reinforcement 42 connecting two opposite corners of the rectangle. Of course, other arrangements of the reinforcement or reinforcements 42 may be envisaged.

In accordance with one embodiment, the panel 38 is made of a fabric resistant to tearing. In the presence of reinforcements 42, the fabric panel 38 includes grommets or eyelets for connecting each reinforcement 42 to the panel 38.

Of course, the invention is not limited to these embodiments of the panel 38.

Regardless of the embodiment, the panel 38 must be light in weight. In the case of an entry airlock 32, the panel 38 has a first face 38.1 oriented toward the passenger cabin 14 in the closed state and a second face 38.2 opposite the first face 38.1 oriented toward the cockpit 12.

In accordance with one embodiment, each strap 40 takes the form of a strip of fabric. To give an order of magnitude, each strap 40 has a width of the order of 5 to 10 cm. For example, each strap 40 is made of the same material as the aircraft seatbelts.

At least one of the straps 40 may include reinforcing fibers to resist cutting.

Regardless of the embodiment, each strap 40 is flexible.

Each strap 40 is connected to the panel 38 by at least one connection element 44, such as at least one seam, for example, extending between the first and second ends 44.1, 44.2.

In accordance with one arrangement, the straps 40 of the removable barrier 30 are parallel to one another and parallel to a first direction approximately perpendicular to the first and second edges 36.1, 36.2 of the frame 34 that they connect in the closed state. In accordance with a first alternative, these straps 40 are regularly distributed in a second direction perpendicular to the first direction. In accordance with a second alternative, the straps 40 are distributed in an irregular manner in the second direction perpendicular to the first direction in such a manner that the gap between the straps in this second direction is smaller in a central part of the panel 38 than the gap between the straps in lower or upper parts of the panel 38.

In the case of a rectangular panel 38, a first strap 40a is positioned at the level of the side C3 of the panel 38 and a second strap 40b is positioned at the level of the side C4 of the panel 38.

Figure 10:
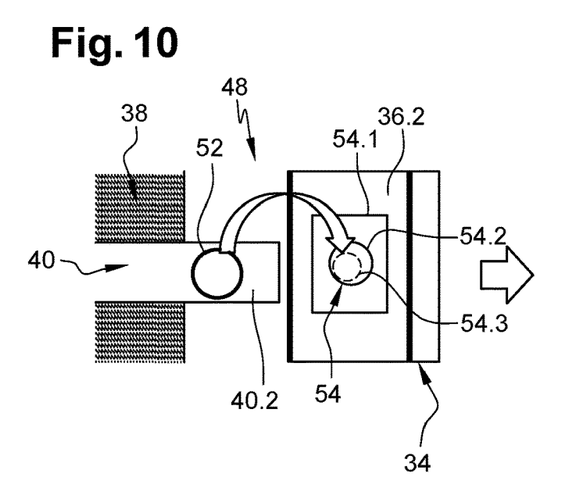
FIG. 10 is a front view of a system for attaching a strap to a frame edge, in the unattached state, illustrating one embodiment of the invention.
Figure 11:
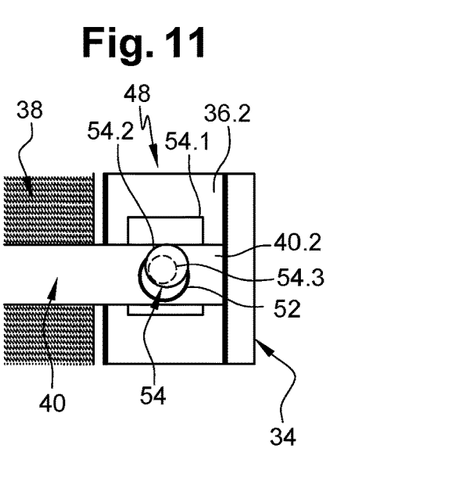
FIG. 11 is a front view of the attachment system that can be seen in FIG. 10 in the attached state.

For each strap 40, the removable barrier 30 includes a first connection 46.1 for, at least in the closed state, connecting the first end 40.1 of the strap 40 and the first edge 36.1 and a second connection 46.2 for, at least in the closed state, connecting the second end 40.2 of the strap 40 and the second edge 36.2. At least one of the first and second connections 46.1, 46.2 is an attachment system 48 providing a temporary connection and occupying an unattached state, as illustrated in FIG. 10, in which the first and/or second end(s) 40.1, 40.2 of the strap 40 and the first and/or second edge(s) 36.1, 36.2 are not connected, and an attached state, as illustrated in FIG. 11, in which the first and/or second end(s) 40.1, 40.2 of the strap 40 and the first and/or second edge(s) 36.1, 36.2 are connected.

In accordance with one embodiment, each of the first and second connections 46.1, 46.2 is an attachment system 48 providing a temporary connection.

In accordance with another embodiment, the first connection 46.1 is permanent. It connects the first end 40.1 of the strap 40 and the first edge 36.1 continuously in the closed state and in the open state. The second connection 46.2 is an attachment system 48. It temporarily connects the second end 40.2 of the strap 40 and the second edge 36.2 only in the closed state.

The permanent first connections 46.1 provide a hinge function between the removable barrier 30 and the first edge 36.1 of the frame 34.

In accordance with a first variant, each first connection 46.1 includes at least one fixing element, such as a screw, for example, passing through the strap and screwed into the frame 34.

Figure 9:
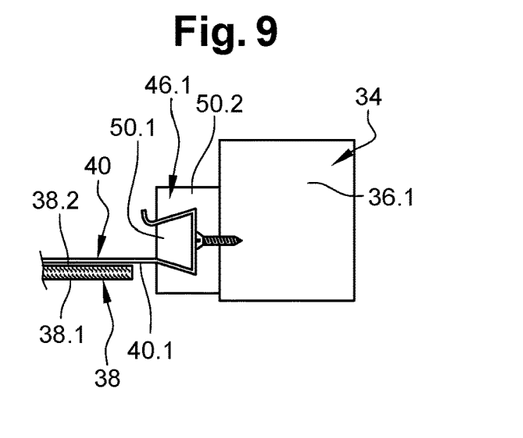
FIG. 9 is a view from above of a second side of the removable barrier that can be seen in FIG. 4 and a second edge of the frame.

In accordance with a second variant that can be seen in FIG. 9, each first connection 46.1 includes a first profile 50.1 configured to nest in a second profile 50.2 fixed to the frame 34, the strap 40 being pinched between the first and second profiles 50.1, 50.2. A single second profile 50.2 may be common to the various straps 40 while a first profile 50.1 is provided for each strap 40.

Of course, the invention is not limited to these embodiments of the first connection 46.1.

Figure 8:
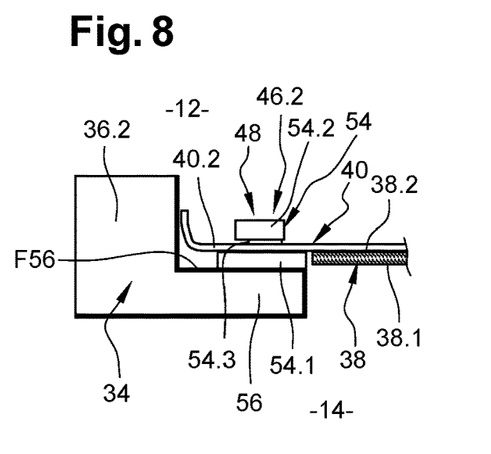
FIG. 8 is a view from above of a first side of the removable barrier that can be seen in FIG. 4 and of a first edge of the frame.

In accordance with an embodiment that can be seen in FIGS. 8, 10 and 11, each attachment system 48 includes an eyelet 52 positioned on the strap 40 in the vicinity of one of its first and second ends 40.1, 40.2 and producing a hole through the strap 40 and a hook 54 rigidly attached to the frame 34. In accordance with one configuration, each hook 54 includes a plate 54.1 fixed to the frame 34 by means of at least one fixing element, such as one or more screws, a cylindrical head 54.2 including a peripheral edge surface having a section slightly smaller than that of the eyelet 52 to pass through the latter, and a rod 54.3 connecting the plate 54.1 and the head 54.2, having a section smaller than that of the head 54.2 and spaced from the peripheral edge surface of the head 54.2 to form a hook.

In the unattached state that can be seen in FIG. 10, the strap 40 is spaced from the hook 54. To go to the attached state the strap 40 is grasped, its eyelet 52 is positioned in line with the head 54.2 of the hook 54 and then threaded around the head 54.2 until it is positioned at the level of the rod 54.3. The rod 54.3 having a section smaller than that of the head 54.2, the eyelet 52 is suspended from the hook 54 and cannot be unhooked without the intervention of a person.

In accordance with this embodiment, the straps 40 are attached or detached independently of one another.

When the removable barrier 30 is used to control access to the cockpit 12, the attachment systems and/or the frame 34 are configured so that the attachment systems 48 are not accessible from the passenger cabin 14. To this end, the straps 40 are, for example, positioned on the second face 38.2 of the panel 38 and, in each attachment system 48, the hook 54 is positioned on a face of the second edge 36.2 of the frame 34 oriented toward the cockpit 12. It is to be noted that without departing from the scope of the invention the straps may equally be positioned on the first face 38.1 of the panel 38. In accordance with one configuration, the second edge 36.2 of the frame 34 has an L-shaped section and includes a flange 56 having a first face F56 oriented toward the cockpit 12 on which the hooks 54 of the various attachment systems 48 are placed.

Of course, other solutions may be envisaged for the attachment system or systems 48. Thus, in accordance with another embodiment, the removable barrier 30 includes a single attachment system 48 common to the various straps 40, like an upright to which the various straps 40 are permanently connected and that cooperates with the frame 34 in such a manner as to occupy an attached state in which the upright is connected to the frame 34 and a second, unattached state in which the upright is not connected to the frame 34.

Additionally, in at least one attachment system 48, the removable barrier 30 includes a locking system configured to occupy a locked state in which it maintains the attachment system in the attached state and prevents a change of state of the attachment system 46 to the unattached state and an unlocked state in which it allows a change of state of the attachment system 46 to the unattached state.

Regardless of the embodiment, the removable barrier 30 includes at least one attachment system 48 cooperating with the frame 34 and configured to occupy an unattached state in which it does not connect the removable barrier 30 and the frame 34 and an attached state in which it connects the removable barrier 30 and the frame 34.

In accordance with an embodiment that can be seen in FIGS. 6, 7, 12 to 14, at least one strap 40 includes at least one overlength 58.1, 58.2 positioned between at least one of its first and second ends 40.1, 40.2 and the connection element 44 connecting the strap 40 and the panel 38. In accordance with one configuration, each overlength 58.1, 58.2 includes at least two folds 60.1, 60.2 delimiting at least three sections 62.1, 62.2, 62.3 superposed one on the other.

In one variant, at least one of the first and second ends 44.1, 44.2 of the connection element 44 is situated in the vicinity of the fold 60.2 in such a manner that the section 62.3 has a virtually zero length: the overlength 58.1, 58.2 then comprises the two sections 62.1, 62.2.

When unfolded, each first or second overlength 58.1, 58.2 has a length L1, L2 corresponding to the distance between the first or second connection 46.1, 46.2 and the first or second end 44.1, 44.2 of the connection element 44 connecting the panel 38 and the strap 40.

For each overlength 58.1, 58.2, the strap 40 includes at least one breakable connection 64, 66 connecting at least two of the three sections 62.1, 62.2, 62.3 of the overlength 58.1, 58.2 to keep the overlength 58.1, 58.2 folded.

Each first or second breakable connection 64, 66 has a strength threshold S1, S2, the strength threshold S1, S2 corresponding to the energy necessary to break the breakable connection. Thus, as long as the energy exerted on the strap 40 is less than the strength threshold S1, S2 the breakable connection 64, 66 keeps the overlength 58.1, 58.2 folded. As soon as the energy exerted on the strap 40 exceeds the strength threshold S1, S2 the breakable connection 64,66 breaks and the overlength 58.1, 58.2 unfolds.

For each strap 40, the strength threshold S1, S2 of each breakable connection 64, 66 is less than the tensile strength of the strap 40 and the strength of each of the first and second connections 46.1, 46.2 in order to prevent damage to the straps 40 and the first and second connections 46.1, 46.2 in the case of loading of the removable barrier 30, for example during an attempt at intrusion.

Figure 7:
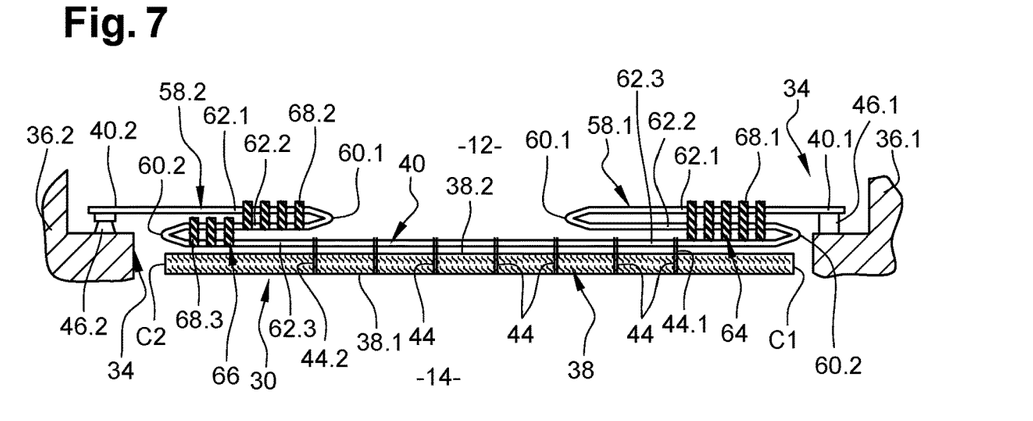
FIG. 7 is a view from above of the removable barrier that can be seen in FIG. 4.
Figure 12:
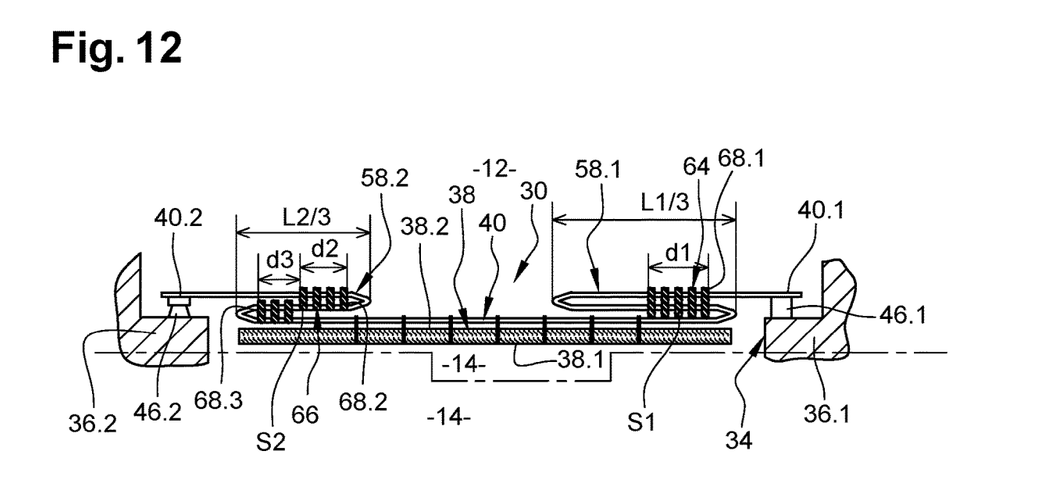
FIG. 12 is a view from above of a removable barrier in the closed state with folded overlengths illustrating one embodiment of the invention.

In accordance with a configuration that can be seen in FIGS. 7 and 12, each strap 40 includes a first folded overlength 58.1 and at least one first breakable connection 64 keeping the first overlength 58.1 folded at the level of the first end 40.1 and a second folded overlength 58.2 and at least one second breakable connection 66 keeping the second overlength 58.2 folded at the level of the second end 40.2. Alternatively, each strap 40 includes a single folded overlength 58.1, 58.2 at the level of the first or second end 40.1, 40.2 and at least one breakable connection keeping the overlength folded.

In accordance with one embodiment, the first or second breakable connection 64, 66 of each overlength 58.1, 58.2 includes at least one seam 68.1, 68.2, 68.3 having a length d1, d2, d3 and a density of stitches. For each seam 68.1, 68.2, 68.3 the length d1, d2, d3 and/or the density of stitches is or are adjusted as a function of the strength threshold S1, S2 required for the first or second breakable connection 64, 66.

In accordance with a configuration that can be seen in FIGS. 7 and 12, the first breakable connection 64 includes a single seam 68.1 connecting the first and second sections 62.1, 62.2 of the first overlength 58.1. The second breakable connection 66 includes a first seam 68.2 connecting the first and second sections 62.1, 62.2 of the second overlength 58.2 and a second seam 68.3 connecting the second and third sections 62.2, 62.3 of the second overlength 58.2, the first and second seams 68.2, 68.3 being offset relative to one another and extending over virtually all the length of the second section 62.2.

Figure 13:
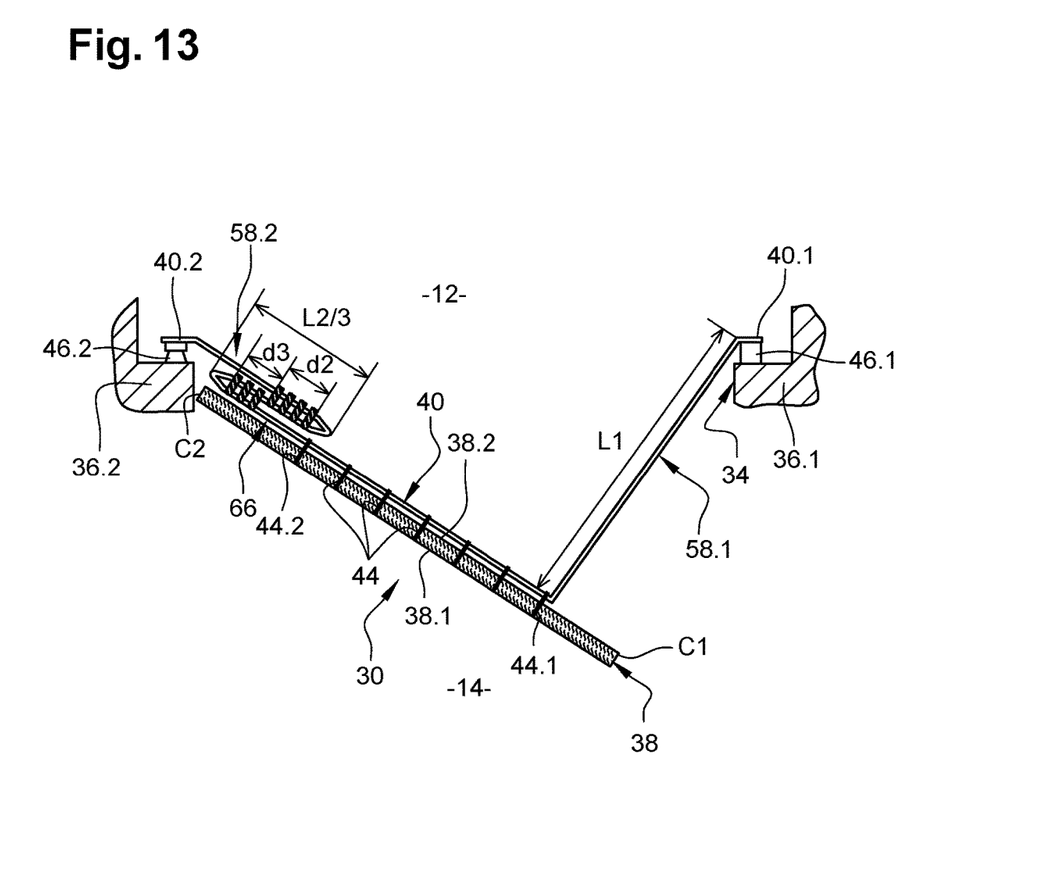
FIG. 13 is a view from above of the removable barrier that can be seen in FIG. 12 in the event of depressurization in one of the zones separated by the removable barrier, after some of the breakable connections break.
Figure 14:
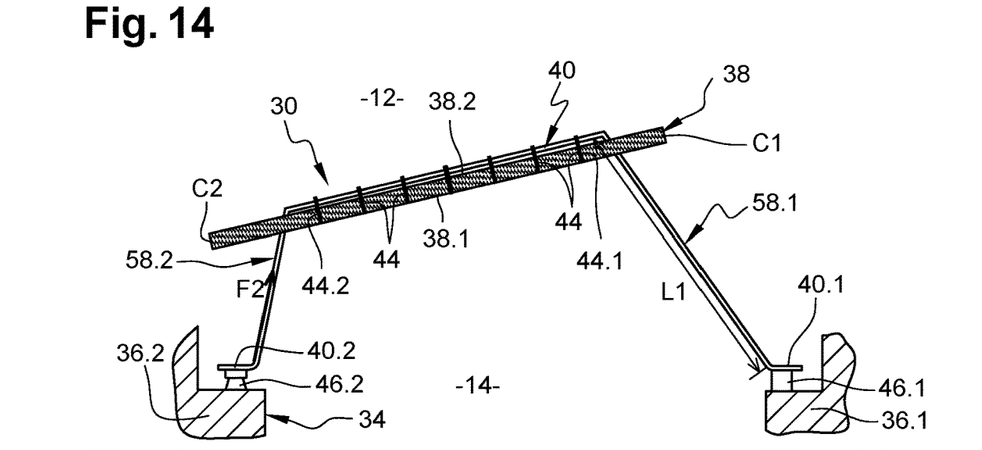
FIG. 14 is a view from above of the removable barrier that can be seen in FIG. 12 in the case of an attempt at intrusion, after all the breakable connections break.

In accordance with a configuration that can be seen in FIG. 13, the strength threshold S1 of the first breakable connection 64 is less than the strength threshold S2 of the second breakable connection 66. This first threshold S1 of the first breakable connection 64 is determined in such a manner that the first breakable connection 64 breaks in the event of a pressure difference on either side of the removable barrier 30 exceeding a given threshold, for example in the event of depressurization of the cockpit 12 or of the passenger cabin 14. The length L1 of the first overlength 58.1 is determined to obtain a satisfactory flow of air between the cockpit 12 and the passenger cabin 14 in the event of depressurization in one or the other thereof.

Thus, at least one overlength 58.1, 58.2 and at least one breakable connection 64, 66 provide(s) a function of equalizing pressures on either side of the removable barrier 30 in the event of depressurization.

The strength thresholds S1, S2 of the first and second breakable connections 64, 66 are determined to limit the propagation of forces toward the frame 34. In this case the rupture of the first and second breakable connections 64, 66 absorbs some or all of the energy generated during the attempt at intrusion. Thus, at the level of the first and second connections 46.1, 46.2 the removable barrier 30 causes forces F1 (approximately equal to S1), F2 (approximately equal to S2) less than those necessary to degrade or to break the first and second connections 46.1, 46.2. Moreover, the sum of these forces F1 and F2 is less than the sum of the forces that a rigid barrier system would generate on the uprights 36.1 and 36.2, thereby limiting the need to reinforce those uprights and the structures to which they are fixed.

Figure 15:
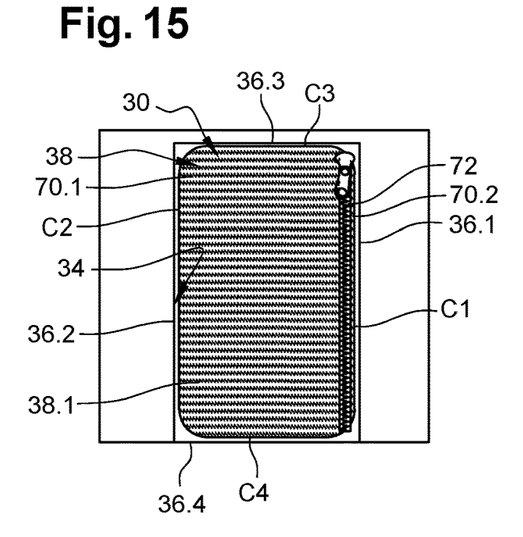
FIG. 15 is a front view of a removable barrier illustrating another embodiment with the panel comprising two parts connected by a breakable connection.
Figure 16:
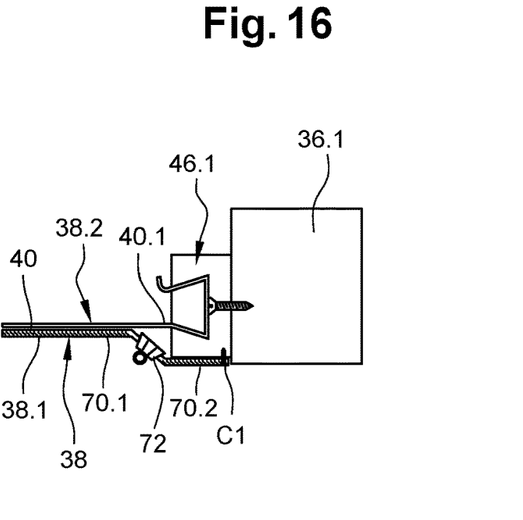
FIG. 16 is a view from above of one side of the removable barrier that can be seen in FIG. 15.

In accordance with one embodiment that can be seen in FIGS. 15 and 16, if the first connection 46.1 of each strap 40, positioned in the vicinity of the first side C1 of the panel 38, is permanent, that first side C1 of the panel 38 is connected to the first edge 36.1 of the first frame 34. Complementing this, the panel 38 includes at least two parts 70.1, 70.2 connected by a longitudinal breakable connection 72 extending between the third and fourth sides C3, C4, parallel to the first side C1 and positioned in the vicinity of the first side C1.

In accordance with one configuration, the longitudinal breakable connection 72 is a slide that has a particular strength in such a manner as to break in the event of an attempt at intrusion and/or depressurization before the breakable connections 64, 66 present at the level of the overlengths 58.1, 58.2.

Regardless of the embodiment, the first connection 46.1 is configured to connect the first end 40.1 of the strap to a first edge 36.1 of the frame 34 at least temporarily and the second connection 46.2 is configured to connect the second end 40.2 of the strap 40 to a second edge 36.2 of the frame 34 at least temporarily. By at least temporarily is meant that the first or second connection 46.1, 46.2 is configured to connect the first or second end 40.1, 40.2 of the strap to a first or second edge 36.1, 36.2 of the frame 34 temporarily or permanently.

When the second end 46.2 of each strap 40, positioned in the vicinity of the second side C2 of the panel 38, is connected to an upright of an attachment system 48 connected to the second edge 36.2 of the frame 34, the second side C2 of the panel 38 may be connected to that upright. In this case, in a complementary way, the panel 38 includes at least two parts connected by a longitudinal breakable connection extending between the third and fourth sides C3, C4, parallel to the second side C2 and positioned in the vicinity of the second side C2.

In accordance with one embodiment, the panel 38 includes at least one side C1, C2 connected directly or indirectly to the frame 34 and at least two parts 70.1, 70.2 connected by at least one longitudinal breakable connection 72 positioned close to and parallel to the sides C1, C2 of the panel 38 connected directly or indirectly to the frame 34.

The fact that the first and/or second side(s) C1 and C2 is or are connected to the first edge 36.1 of the frame 34 and/or to an upright of the attachment system 48 itself connected to the second edge 36.2 of the frame 34 contributes to improving the esthetics of the removable barrier 30.

When the removable barrier 30 is used to delimit an entry airlock 32 of a cockpit 12, the lateral wall 24 of the corridor 22 (to which the first connections 46.1 are connected) includes a housing 74 sized to house the removable barrier 30 in the open state.

Although described as applied to an entry airlock of a cockpit of an aircraft, the removable barrier 30 in accordance with the invention may be used in different vehicles (boat, bus, train, aircraft, . . . ) in which it is necessary to prohibit passage through an opening 28 temporarily.

Figure 17:
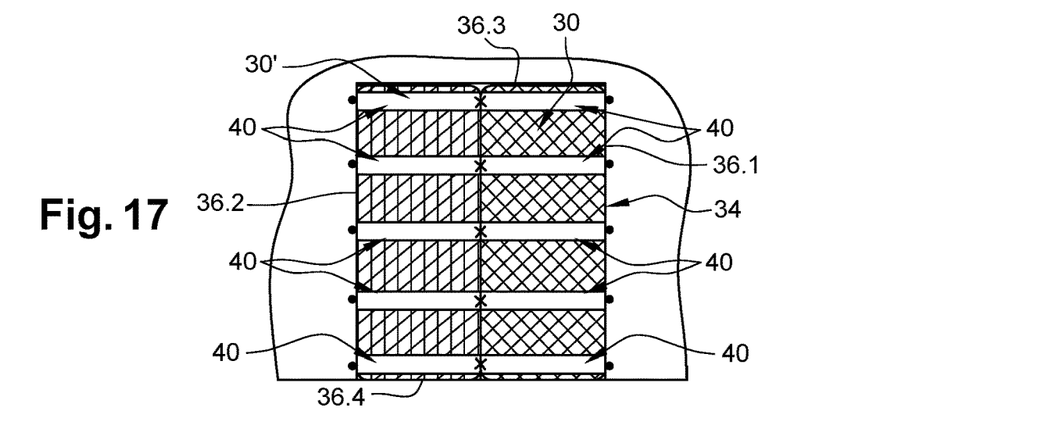
FIG. 17 is a front view of a frame including two removable barriers illustrating another embodiment of the invention.

Regardless of the application, and regardless of the embodiment, the frame 34 delimiting an opening 28 includes one or more removable barriers 30, 30' configured to occupy an open state in which it or they free(s) the opening 28 and a closed state in which it or they block(s) the opening 28, at least one of the removable barriers being as described above. Thus, as illustrated in FIG. 17, the frame 34 may include two removable barriers 30, 30' interconnected by at least one attachment system 48, each of them being connected to one of the edges of the frame 34.

The invention enables a lightweight removable barrier 30 of simple design to be obtained that can be installed on new vehicles or on existing vehicles.

The overlengths 58.1, 58.2 and the first and second breakable connections 64, 66 make it possible to obtain a removable barrier 30 that is able to equalize the pressures on either side of the removable barrier 30 in the event of depressurization and that is strong and capable of absorbing some of the energy generated and of limiting the forces transmitted to the frame 34 during an attempt at intrusion. This removable barrier 30 obviates the need to reinforce the structures around the removable structure 30 and consequently to increase the weight thereof. Moreover, these structures do not need to integrate pressure equalizing systems.

The costs of maintaining the removable barrier 30 are the lowest possible.

Finally, the panel 38 of the removable barrier 30 may be decorated in order to make it as esthetic as possible. It may also include openings to enable observation of the airlock 32 from the passenger cabin 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A removable barrier comprising:
    a panel configured to block at least partly an opening delimited by a frame,
    a plurality of straps each connected to the panel by at least one connection element and each having first and second ends as well as, for each strap, a first connection configured to connect the first end of the strap to a first edge of the frame at least temporarily, a second connection configured to connect the second end of the strap to a second edge of the frame at least temporarily, at least one folded overlength positioned between the connection element and at least one of the first and second ends of the strap, and at least one breakable connection keeping the at least one overlength folded.

2. The removable barrier as claimed in claim 1, wherein said at least one overlength of each strap is situated at a level of the first end or of the second end of said strap so that:

when the overlength corresponds to a first overlength at the level of the first end of the strap, the strap includes said folded first overlength and at least one first breakable connection keeping the first overlength folded and having a first strength threshold; and when the overlength corresponds to a second overlength at the level of the second end of the strap, the strap includes said folded second overlength and at least one second breakable connection keeping the second overlength folded and having a second strength threshold.

3. The removable barrier as claimed in claim 2, wherein each strap includes said first overlength and said second overlength.

4. The removable barrier as claimed in claim 2, wherein each overlength includes at least two folds delimiting at least three sections superposed one on the other, and wherein the first breakable connection and the second breakable connection of each overlength includes at least one seam connecting at least two sections of the overlength and having a length as well as a density of stitches, at least one of a length or a density of stitches of each seam being adjusted as a function of a strength threshold required for the first or second breakable connection.

5. The removable barrier as claimed in claim 2, wherein the first strength threshold of the first breakable connection is less than the second strength threshold of the second breakable connection, the first threshold being determined in such a manner that the first breakable connection breaks in an event of a pressure difference on either side of the removable barrier exceeding a given threshold.

6. The removable barrier as claimed in claim 2, wherein for each strap, the strength threshold of each breakable connection is determined to prevent damaging the strap and the first connection and the second connection in an event of loading of the removable barrier.

7. The removable barrier as claimed in claim 1, wherein the panel is flexible.

8. The removable barrier as claimed in claim 7, wherein the panel includes at least one reinforcement to stiffen it.

9. An aircraft including at least one removable barrier as claimed in claim 1.

10. An aircraft comprising:

a cockpit, a passenger cabin, an entry airlock connecting the passenger cabin and the cockpit delimited by an armored door, a removable barrier as claimed in claim 1 offset toward the passenger cabin relative to the armored door, said removable barrier being positioned at a level of a frame delimiting an opening and including parallel first and second edges, wherein the panel has a first face oriented toward the passenger cabin and a second face opposite the first face, and wherein the straps are positioned on at least one of the first and second faces.

11. The aircraft as claimed in claim 10, wherein the first connection of each strap is permanent and connects the first end of each strap and the first edge of the frame.

12. The aircraft as claimed in claim 10, wherein the removable barrier includes at least one attachment system cooperating with the frame and configured to connect the second ends of the straps and the frame temporarily.

13. The aircraft as claimed in claim 12, wherein each attachment system includes an eyelet positioned on the strap in a vicinity of the second end and a hook rigidly attached to the frame, the attachment system being configured to occupy an unattached state in which the strap is spaced from the hook and an attached state in which the eyelet of the strap is suspended from the hook.

14. The aircraft as claimed in claim 13, wherein in each attachment system the hook is positioned on a face of the second edge of the frame oriented toward the cockpit.

15. The aircraft as claimed in claim 10, wherein the panel includes at least two parts connected by a breakable connection.

16. The aircraft as claimed in claim 15, wherein the panel includes at least one side connected directly or indirectly to the frame, the breakable connection being positioned close to and parallel to the side of the panel connected directly or indirectly to the frame.

17. The aircraft as claimed in claim 16, wherein the breakable connection has a strength limit less than that of the at least one breakable connection of the straps.

* * * * *